UNITED STATES PATENT OFFICE.

GEORGE W. DAVIS, OF FITCHBURG, MASSACHUSETTS, ASSIGNOR TO SILAS PRATT AND E. S. RUSSELL.

IMPROVED COMPOSITION FOR PAVEMENTS, &c.

Specification forming part of Letters Patent No. 58,718, dated October 9, 1866.

*To all whom it may concern:*

Be it known that I, GEORGE W. DAVIS, of Fitchburg, in the county of Worcester and Commonwealth of Massachusetts, have invented a new and useful Elastic Concrete for Walks and other similar purposes; and I do hereby declare that the following is a full, clear, and exact description of the same.

My improved elastic concrete is composed of the following substances, and in the proportions named.

Substances compounded in proportions as follows: Gas-tar, one and one-half gallon; chloride of lime, one-half pint; yellow Roman hydraulic cement, one pint; ground slate, one quart; sand, one-half bushel; calcine-gypsum, one pint; brown cement, one quart; charcoal-dust, two quarts; copperas, one-half pound; lime, one pint; hard-coal ashes, one-half peck.

The above substances are to be well and thoroughly mixed together, and used in making walks and for other similar purposes.

Whatever amount of concrete may be prepared at any one time, the above substances should be compounded substantially in the proportions named above.

A walk made from my improved concrete is elastic, smooth, and is not seriously affected by the heat or cold resulting from the change of seasons. Again, when laid, it is free from that very disagreeable smell which arises from all other concrete walks in which gas-tar is used.

Having described my improved elastic concrete, what I claim as my invention, and desire to secure by Letters Patent, is—

A compound for covering walks and for other similar purposes, composed of the above-named substances substantially in the proportions specified.

GEO. W. DAVIS.

Witnesses:
THOS. H. DODGE,
D. L. MILLER.